Oct. 2, 1956     E. W. SCHALLER     2,764,835
FISHING LURE
Filed Dec. 6, 1954
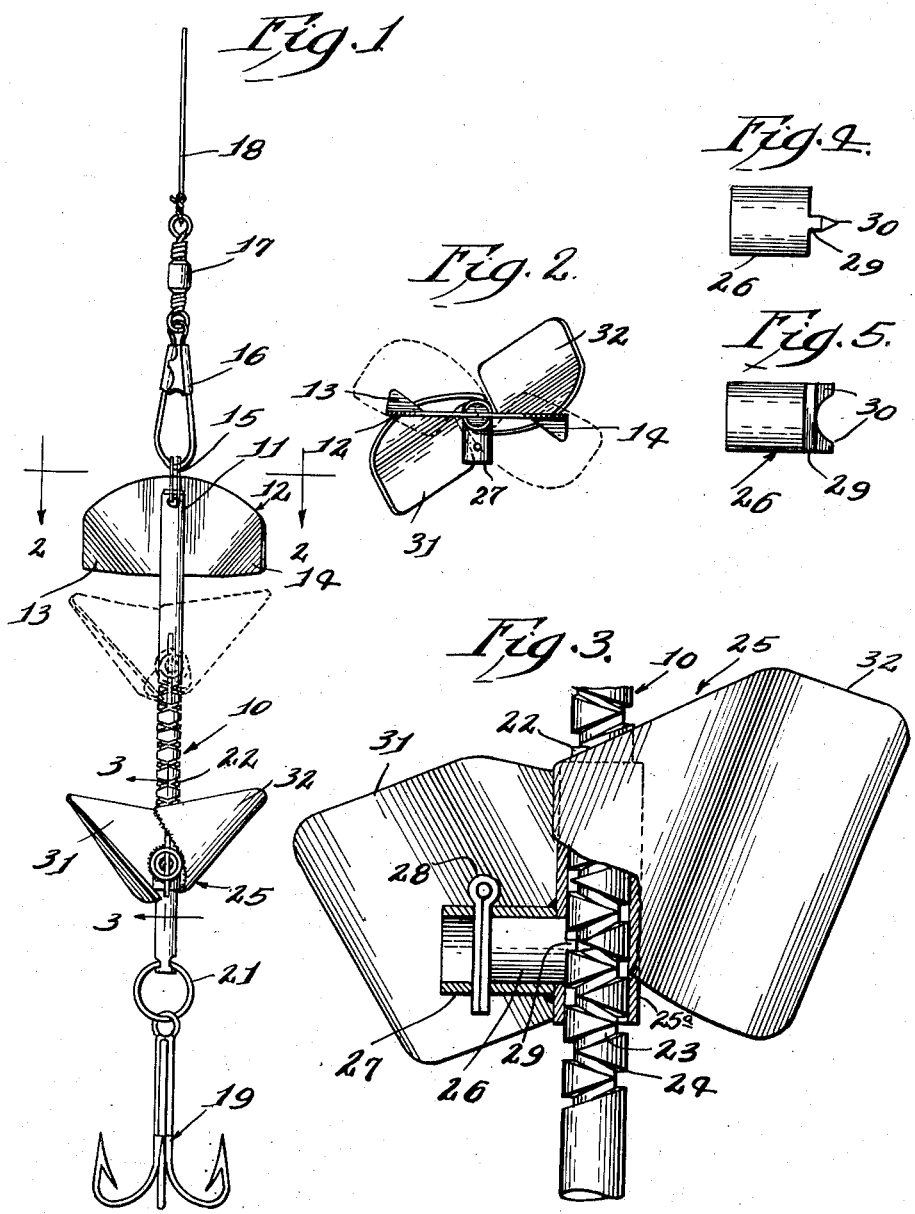

United States Patent Office 2,764,835
Patented Oct. 2, 1956

2,764,835

FISHING LURE

Elmer W. Schaller, Mendota, Ill.

Application December 6, 1954, Serial No. 473,095

7 Claims. (Cl. 43—42.20)

The present invention relates to a fishing lure and more particularly to a novel spinner type of fish lure or artificial bait.

Among the objects of the present invention is the provision of a novel fish lure provided with a grooved shaft and a rotating member or spinner adapted to reciprocate or move back and forth longitudinally of the shaft as the lure is pulled through the water or held in running water and the spinner is caused to rotate about its shaft.

Another object of the present invention is the provision of a novel fishing lure provided with a relatively stationary shaft or rod and a spinner mounted thereon for rotating and reciprocating movement as the lure is pulled through the water, held in running water or retrieved by the fisherman. As thus retrieved or held in running water to permit relative movement between the lure and the water, the spinner will move longitudinally of its shaft or rod rearwardly at a faster rate than when returning to the forward end of the shaft or rod, thereby giving to the lure a unique and novel appearance as it is moved through the water. One or a cluster of hooks are shown trailing from the rear of the shaft.

The present invention further comprehends a novel construction and arrangement of a fishing lure provided with a grooved shaft or rod and a spinning element mounted thereon capable of being rotated about and simultaneously reciprocated longitudinally of its shaft or rod as the lure is pulled or drawn through the water or held in running water, the shaft or rod being spirally grooved in such manner or provided with a double thread whereby the spinning element will automatically reverse its direction of travel longitudinally of the shaft or rod when it reaches either end of the spirally arranged grooves or tracks guiding or directing the spinning element.

In the novel embodiment disclosed, the shaft or rod is held or retained against rotation as the spinner rotates thereabout by means of a plate affixed to the forward end and/or rear of the lure with the rear of the lure provided with one or a cluster of hooks. This novel shaft is so double-threaded or grooved that the rotating member or spinner is movable back and forth or reciprocated as the spinner continues to rotate about its relatively stationary shaft.

Further objects are to provide a construction of maximum simplicity, efficiency, economy and ease of assembly and operation, and such further objects, advantages and capabilities as will later more fully appear and are inherently possessed thereby.

In the drawing:

Figure 1 is a top plan view of my novel fish lure and showing in full outline the spinner or spinning element rotated and simultaneously moved longitudinally along the grooves or tracks of its shaft to its rearmost position prior to return of the spinner to the dotted line position at the forward end of its stroke.

Fig. 2 is a top plan view of the novel fish lure, the view being taken in a horizontal plane substantially on the line 2—2 of Fig. 1 and viewed in the direction of the arrows.

Fig. 3 is a fragmentary enlarged view, part in side elevation and part in vertical cross section, of the shaft and spinning element, the view being taken substantially on the line 3—3 of Fig. 1 and viewed in the direction of the arrows.

Fig. 4 is a view in front elevation of the connector or coupling member for detachably mounting and retaining the rotating member or spinner upon the grooved shaft for reciprocating movement longitudinally or axially of the shaft.

Fig. 5 is a view of the connector or coupling shown in Fig. 4 but turned about its longitudinal axis through approximately 90°.

Referring more particularly to the disclosure in the drawing and to the novel illustrative embodiment therein shown, the present invention comprises a fishing lure provided with a relatively long shaft or rod 10, the forward end 11 of which is bifurcated or slotted to receive a transverse plate 12 preferably having its ends 13 and 14 bent in opposite directions. The rear of the shaft may also be slotted to receive a plate. This plate 12 is retained within the slot by a wire loop or ring 15 connected to and trailing from the usual fastener 16 and swivel connection 17 secured or tied to the end of a fish line 18. The purpose of the plate 12 is to maintain the shaft 10 against substantial rotation.

This novel lure may be used in casting or trolling and is preferably provided with one or a cluster of hooks 19 at its trailing end connected by a loop or ring 21 to the rear of the shaft or rod 10. Intermediate its length the shaft or rod is slotted or grooved at 22 to provide a double thread or connected helically arranged grooves or tracks 23 and 24 extending along the shaft or rod in the manner more clearly shown in Fig. 3, whereby a spinner 25 is moved in both directions axially or longitudinally of the shaft 10.

The spinner or rotating member 25 is provided with an elongated hub 25ª which is free to slide upon and move back and forth along or reciprocate upon the shaft 10 or rod in both directions, but to guide and direct its reciprocating movement the hub is affixed to and guided in the grooved portion 22 of the shaft or rod by means of a connector or coupling member 26. This connector or coupling member 26 is shown in the form of a tubular insert adapted to be received and held in a tubular offset or projection 27 extending laterally from the hub 25ª of the rotating spinner or spinning element 25 and held in this offset or projection 27 by a cotter pin 28 or other suitable retaining means. When in the position shown in Fig. 3, the inner end of the tubular insert or coupling member 26 is disposed and held against the exterior of the shaft or rod 10 with the inner reduced end or projection 29 thereof having spaced prongs or bifurcations 30 received and held in the connecting grooves or tracks 23 or 24 of the double-threaded portion of the shaft 10.

The spinner or rotating member 25 may be rotated in either direction depending upon the conformation or contour of its vanes 31 and 32. Although two such vanes are shown, any suitable number may be provided and their design and contour may vary, their function being to ensure rotation of the spinner or rotating member 25 and to provide a flash or appearance attractive to fish as it moves in the water.

As shown in Fig. 2, these vanes rotate the spinner 25 in a clockwise direction as the fish lure is being pulled through or is moved relative to the water. Assuming the spinner is located at the forward end of the slotted portion 22 of the shaft, when it begins its movement through the water it is rapidly revolved as the coupling or connector 26 rides over the slotted or double-threaded portion of the shaft or rod 10 from the forward toward the rear end thereof with the prongs or projections 30 in a connected groove or track 23.

When the spinner reaches the rear or end of the grooved or double-threaded portion of the shaft, the prongs or projections 30 will enter the connected track or groove 24 from the connected groove or track 23 and the direction of travel of the spinner will be reversed so that the spinner 25 travels forwardly along the track until it again reaches the forward end of the track or groove 24 where its direction of travel longitudinally of the shaft is again reversed. However, during this back and forth or reciprocating movement the direction of rotation of the spinner continues in the same or clockwise direction with the vanes 31 and 32 contoured in approximately the manner shown in the drawing. By reversing these vanes, the direction of rotation of the spinner may be reversed on the grooved or double-threaded portion 22 of the shaft 10.

Due to the action of the water, the speed of rotation and the length of time required for the spinner to traverse the length of the grooved portion 22 is greater when moving rearwardly toward the hook end than when it reverses and returns forwardly, thereby giving a unique action to the lure.

While there is shown in the drawing a preferred embodiment, it is to be understood that the same is susceptible of modification and change, and comprehends other details, arrangements of parts, features and constructions without departing from the spirit of the invention.

It will be apparent that weedless hooks may be substituted for those disclosed, that the novel spinning lure of the present invention will automatically wash itself clear of any collected foreign matter while operating so that it cannot become jammed with mud, sand, etc., and that it will easily move through a weed bed without snagging.

Having thus disclosed the invention, I claim:

1. A fish lure comprising a spinner shaft provided with helically formed connected grooves, a spinning element mounted on said shaft and provided with oppositely projecting vanes whereby the spinning element is rotated as the lure is drawn through the water or held in running water, means for connecting the spinning element to the grooves of the shaft, said grooves being so arranged and connected that as the spinning element is continuously rotated in one direction upon the grooved shaft it is simultaneously and positively reciprocated on the shaft, and means tending to hold the shaft against substantial rotation while the spinner is both rotated and reciprocated in the grooves of the shaft.

2. A fish lure comprising a spinner shaft provided with helically formed connected grooves, a spinner mounted on said shaft and provided with oppositely projecting vanes for rotating the spinner as the lure is drawn through the water or held in running water, means for connecting the spinner to the grooves of the shaft with these grooves so arranged and connected that as the spinner is continuously rotated it is simultaneously and positively moved longitudinally back and forth upon the shaft, and means tending to hold the shaft against substantial rotation while the spinner is both rotated and reciprocated in the grooves of the shaft.

3. In a fish lure, an elongated shaft, a plate adjacent one end of the shaft and one or more hooks adjacent the other end, said plate being so contoured as to retain the shaft against substantial rotation, helically arranged grooves formed in the shaft intermediate its ends and a spinning element having a part engaged in the grooves and provided with one or more outwardly projecting vanes adapted to rotate said spinning element as the lure is moved relative to the water, said grooves being so arranged that as the spinning element is rotated about the shaft in said grooves said part rides back and forth in the grooves whereby the spinning element is positively reciprocated back and forth on the shaft simultaneous with its rotation.

4. In a fish lure of the spinner type, a shaft having a helically grooved portion with grooves directed in opposite directions along the shaft, a spinner coupled to the grooved portion of the shaft for rotation and positive simultaneous longitudinal movement along the shaft from one end to the other end of said grooved portion, and means for retaining the shaft against substantial rotation as the lure is drawn through the water or held in running water.

5. A fish lure comprising a double-threaded shaft, a spinning element mounted on the shaft, means for connecting the spinning element to the threads of the shaft whereby the spinning element is continuously rotated in one direction and such rotation causes the spinning element to be simultaneously and positively reciprocated on the shaft from one end to the other end of said grooved portion, and means for retaining the shaft against substantial rotation as the lure is drawn through the water or held in running water.

6. A fish lure comprising a double-threaded shaft, a spinning element mounted on the shaft, means for connecting the spinning element to the threads of the shaft whereby the spinning element is continuously rotated in one direction about the threads of the shaft and such rotation causes the spinning element to be simultaneously and positively reciprocated on the shaft from one end to the other end of the threads of the shaft, and means on said shaft for retaining the shaft against substantial rotation as the lure is drawn through the water or held in running water.

7. A fish lure comprising a spinner shaft having a helically grooved portion, a spinner rotatably mounted on said shaft and provided with an offset coupling located in the grooved portion whereby the spinner is rotated and simultaneously and positively moved back and forth in said portion longitudinally of the shaft as the lure is drawn through the water or held in running water, and means tending to hold the shaft against substantial rotation while the spinner is both rotated and reciprocated in the grooves of the shaft.

References Cited in the file of this patent

UNITED STATES PATENTS

| | | |
|---|---|---|
| 465,162 | Coe | Dec. 15, 1891 |
| 613,519 | Junod | Nov. 1, 1898 |
| 1,339,189 | Frensdorf | May 4, 1920 |
| 2,235,868 | Coolidge et al. | Mar. 25, 1941 |
| 2,462,576 | Walker | Feb. 22, 1949 |

FOREIGN PATENTS

| | | |
|---|---|---|
| 893,581 | France | Feb. 7, 1944 |